United States Patent
Conte

(10) Patent No.: US 11,412,756 B2
(45) Date of Patent: Aug. 16, 2022

(54) ICE-CREAM MAKING MACHINE

(71) Applicant: TEKNOICE S.R.L., Milan (IT)

(72) Inventor: Santino Claudio Conte, Milan (IT)

(73) Assignee: TEKNOICE S.R.L., Milan (IT)

(*) Notice: Subject to any disclaimer, the term of this patent is extended or adjusted under 35 U.S.C. 154(b) by 789 days.

(21) Appl. No.: 16/343,497

(22) PCT Filed: Sep. 6, 2017

(86) PCT No.: PCT/IB2017/055371
§ 371 (c)(1),
(2) Date: Apr. 19, 2019

(87) PCT Pub. No.: WO2018/073664
PCT Pub. Date: Apr. 26, 2018

(65) Prior Publication Data
US 2019/0297914 A1   Oct. 3, 2019

(30) Foreign Application Priority Data

Oct. 19, 2016  (IT) .................. 102016000104977

(51) Int. Cl.
*A23G 9/22* (2006.01)
*A23G 9/20* (2006.01)
*A23G 9/04* (2006.01)
*A23G 9/14* (2006.01)
(Continued)

(52) U.S. Cl.
CPC ............. *A23G 9/22* (2013.01); *A23G 9/04* (2013.01); *A23G 9/14* (2013.01); *A23G 9/20* (2013.01); *A23G 9/282* (2013.01); *A23G 9/045* (2013.01); *A23G 9/08* (2013.01)

(58) Field of Classification Search
CPC combination set(s) only.
See application file for complete search history.

(56) References Cited

U.S. PATENT DOCUMENTS 1,442,945 A * 1/1923 Hauk ................ A23G 9/16
366/348
4,316,490 A 2/1982 Meyer
(Continued)

FOREIGN PATENT DOCUMENTS

EP  1507976  2/2005
WO  2008120250  10/2008

OTHER PUBLICATIONS

International Search Report and Written Opinion of the International Searching Authority, PCT/IB2017/055371, European Patent Office, dated Oct. 27, 2017.

*Primary Examiner* — Emmanuel E Duke
(74) *Attorney, Agent, or Firm* — Valauskas Corder LLC

(57) ABSTRACT

An ice-cream making machine comprises a first production line and a second production line with an inlet pump, a mixing and chilling chamber, an outlet pump connected in series, as well as a cooling circuit in heat exchange connection with the mixing and chilling chamber, respectively, wherein an auxiliary conduit selectively connects and disconnects the outlet pump of the first production line to/from an inlet of the mixing and chilling chamber of the second production line, so as to be able to process either two flows of confectionery mass mutually independently or a single flow of confectionery mass by means of both production lines.

14 Claims, 6 Drawing Sheets

(51) Int. Cl.
    *A23G 9/28*         (2006.01)
    *A23G 9/08*         (2006.01)

(56) References Cited

U.S. PATENT DOCUMENTS

| | | | | |
|---|---|---|---|---|
| 5,277,037 | A * | 1/1994 | Gram | A23G 9/228 |
| | | | | 62/306 |
| 5,709,095 | A * | 1/1998 | Johnson | A23G 9/281 |
| | | | | 366/311 |
| 5,713,209 | A | 2/1998 | Hunchar et al. | |
| 6,305,189 | B1 * | 10/2001 | Menin | A23L 3/405 |
| | | | | 62/544 |
| 6,637,214 | B1 * | 10/2003 | Leitzke | A23G 9/163 |
| | | | | 62/342 |
| 9,335,082 | B2 * | 5/2016 | Gist | A23G 9/12 |
| 2014/0305618 | A1 * | 10/2014 | Newton | A23G 9/22 |
| | | | | 29/890.036 |

* cited by examiner

ICE-CREAM MAKING MACHINE

The present invention relates to a machine for making ice-cream, in particular industrial ice-cream, by conveying a liquid or semi-liquid confectionery mass (which may be a neutral or savory mass, according to the defined flavor), adding air to the conveyed confectionery mass, mixing and emulsifying the confectionery mass with the added air and chilling the mixed and emulsified confectionery mass at a temperature below zero degrees centigrade, typically about −5° C. to −6° C., but also at colder temperature, e.g. −9° C. if a stiffer consistency of the produced ice-cream is desired.

The known industrial ice-cream making machines comprise a support and housing structure which accommodates a single production line, consisting of:

an inlet conduit with a first end connectable to a source containing a starting confectionery mass and a second end, an inlet pump connected in the inlet conduit, a mixing and chilling chamber with an inlet opening for the confectionery mass, connected to the second end of the inlet conduit and an outlet opening, an outlet conduit with a first end connected to the outlet opening of the mixing and chilling chamber, and a second end, an outlet pump connected in the outlet conduit, an air conduit having a first end connectable to an air source and a second end connected to the inlet conduit at an air supply point between the input pump and the mixing and chilling chamber, a cooling circuit with compression/expansion cycle in heat exchange connection with the mixing and chilling chamber.

The ice-making machines of the prior art thus produce a mixed ice-cream mass emulsified with air at a standard temperature of about −5° C. to −6° C. The ice-cream mass must be successively frozen at a temperature of about −9° C. or lower for preservation which is safe from the food safety point of view and stable in terms of the ice-cream shape profile.

The ice-cream machines of the prior art are not very versatile, both with reference to production speed in terms of kilograms or liters per hour and in terms of chilling temperature of the ice-cream mass let out from the machine.

The production speed, meaning the flow rate of the processed confectionery mass, cannot be varied in a broad range, because the mixing system inside the mixing chamber and also the chilling circuit are usually optimized for a given flow rate, with the consequence that increasing production beyond the standard value would inevitably lead to insufficient emulsification and mixing of the ice-cream mass and insufficient chilling, with consequent instability and liquid residues in the produced ice-cream.

On the other hand, the technical features of the compression/expansion chilling circuit do not allow adjusting the chilling temperature of the confectionery mass, unless by turning it on/off in alternating fashion, which would lead to an unacceptable alternating of excessively liquid and excessively frozen zones in the produced ice-cream.

A further need felt in the industrial ice-cream production sector is that of being able to refrigerate the ice-cream, even before it is let out from the machine, to a temperature below than the standard temperature of −5° C./−6° C., because for some types of ice-cream the standard temperature does not confer a sufficient mechanical stability to the ice-cream mass to prevent it from "collapsing" under its own weight in the containers even before completing the definitive freezing inside a freezing store or tunnel. Indeed, the contents of the ice-cream trays arranged in the middle of the freezing store, and thus further from the cooling walls, often appears collapsed or flattened, which is less tempting and consequently more difficult to sale. The need itself for a more intense chilling of the ice-cream mass already inside the production machine arises if the ice-cream is packed in transparent containers, in which avoiding smears visible from the outside is desirable.

On the other hand, some ice-cream mixtures must be enriched with granules of fruit, nuts, cereals, chocolate or other, applied onto the outer surface of an extrudate of the ice-cream mass and partially squeezed into the ice-cream mass to ensure its adhesion. In this case, chilling at excessively low temperature would stiffen the ice-cream mass and prevent the penetration of additional granules. In these cases, it is therefore desirable to let the ice-cream out from the production machine at a standard temperature of about −5° C./−6° C. or slightly less.

The ice-cream making machines of the type described above cannot operate on a case-by-case basis in the various required operating conditions and therefore are usually only used for producing a single type of ice-cream or different types of ice-creams which, in all cases, require the same production conditions.

It is therefore the object of the present invention to provide a machine for making ice-cream, in particular industrial ice-cream, having such features as to be adaptable in versatile manner to various production conditions and to different types of ice-cream, in particular with reference to ice-cream production speed and production temperature.

These and other objects are achieved by means of an ice-cream making machine comprising:

a support and housing structure which accommodates a first production line and a second production line, wherein the first production line comprises:

a first inlet conduit with a first end connectable to a source containing a starting confectionery mass and a second end, a first inlet pump connected in the first inlet conduit.

a first mixing and chilling chamber with an inlet opening for the confectionery mass, connected to the second end of the first inlet conduit, and an outlet opening, a first outlet conduit with a first end connected to the outlet opening of the first mixing and chilling chamber, and a second end, a first outlet pump connected in the first outlet conduit, a first air conduit having a first end connectable to an air source and a second end connected to the first inlet conduit at a first air supply point between the first inlet pump and the first mixing and chilling chamber, a first cooling circuit with compression/expansion cycle in heat exchange connection with the first mixing and chilling chamber, wherein the second production line comprises:

a second inlet conduit with a first end connectable to a source containing a starting confectionery mass and a second end, a second inlet pump connected in the second inlet conduit, a second mixing and chilling chamber with an inlet opening for the confectionery mass, connected to the second end of the second inlet conduit and an outlet opening, a second outlet conduit with a first end connected to the outlet opening of the second mixing and chilling chamber and a second end.

a second outlet pump connected in the second outlet conduit, a second air conduit having a first end connectable to an air source and a second end connected to the second inlet conduit at a second air supply point between the second inlet pump and the second mixing and chilling chamber.

a second cooling circuit with compression/expansion cycle in heat exchange connection with the second mixing and chilling chamber, wherein the machine further comprises an auxiliary conduit configured to allow to connect the first outlet conduit in communication selectively either to the second inlet conduit or to the inlet opening of the first mixing and chilling chamber and to disconnect them from each other, in such a way that:

with the auxiliary conduit in disconnected configuration, the first and the second production line process ice-cream flows independently of each other, and with the auxiliary conduit in connected configuration, the first and the second production line are arranged in series and together process a single ice-cream flow.

A machine thus configured allows to vary the production conditions, in particular the production speed, the chilling temperature and the number of ice-cream strings, in versatile manner.

In addition to the lower cost of a single machine with respect to a plurality of machines of the prior art, integrating a plurality of production lines in a single machine, i.e. in a single support and housing structure, and in mutually connectable and disconnectable manner, allows a considerable saving of space (the machines of the prior art cannot be stacked one over the other) and interconnections between production lines which have been impossible until now.

In order to better understand the invention and appreciate its advantages, some non-limitative examples of embodiments will be described below with reference to the accompanying figures, in which.

Figure 8:
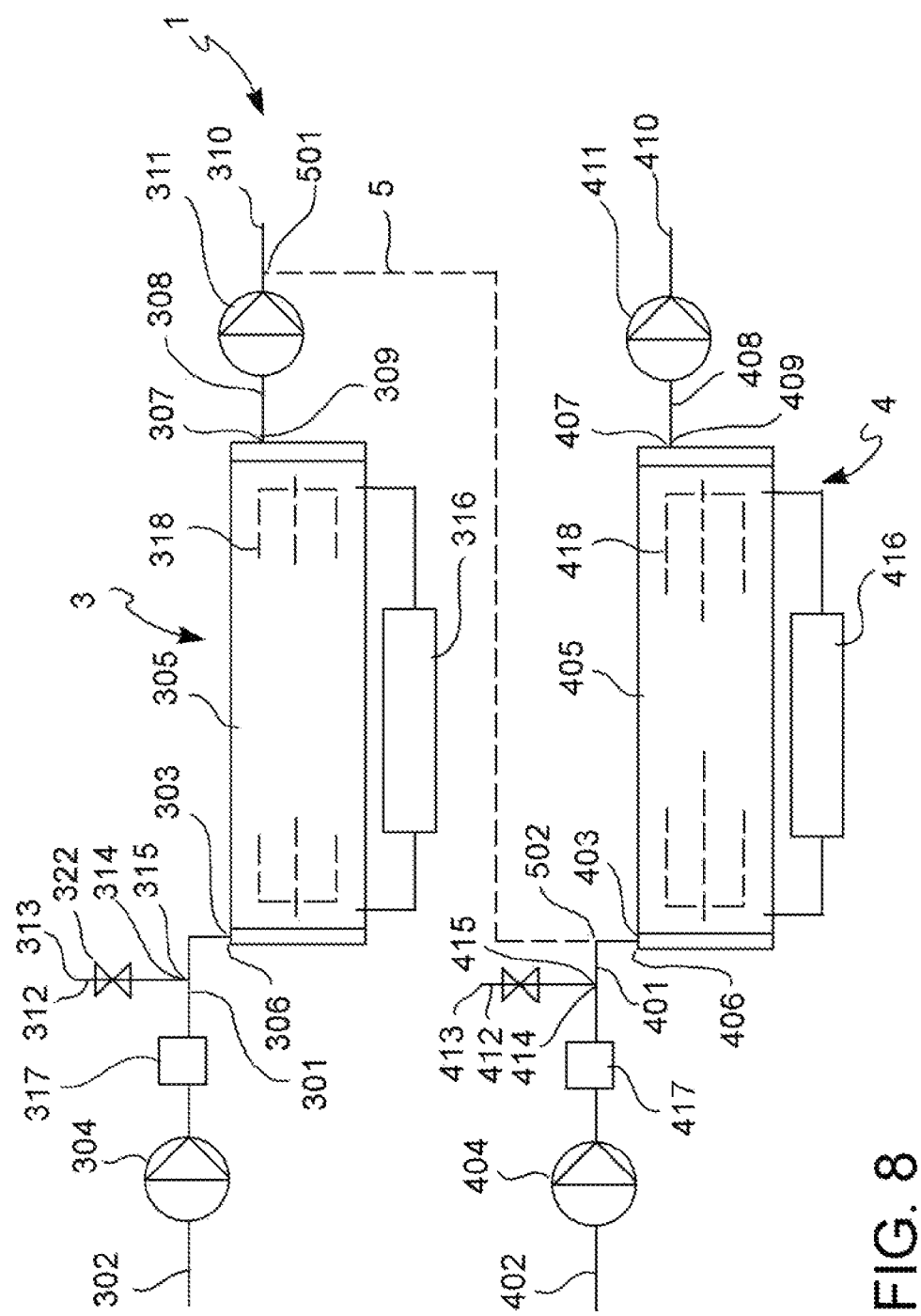
Figure 9:
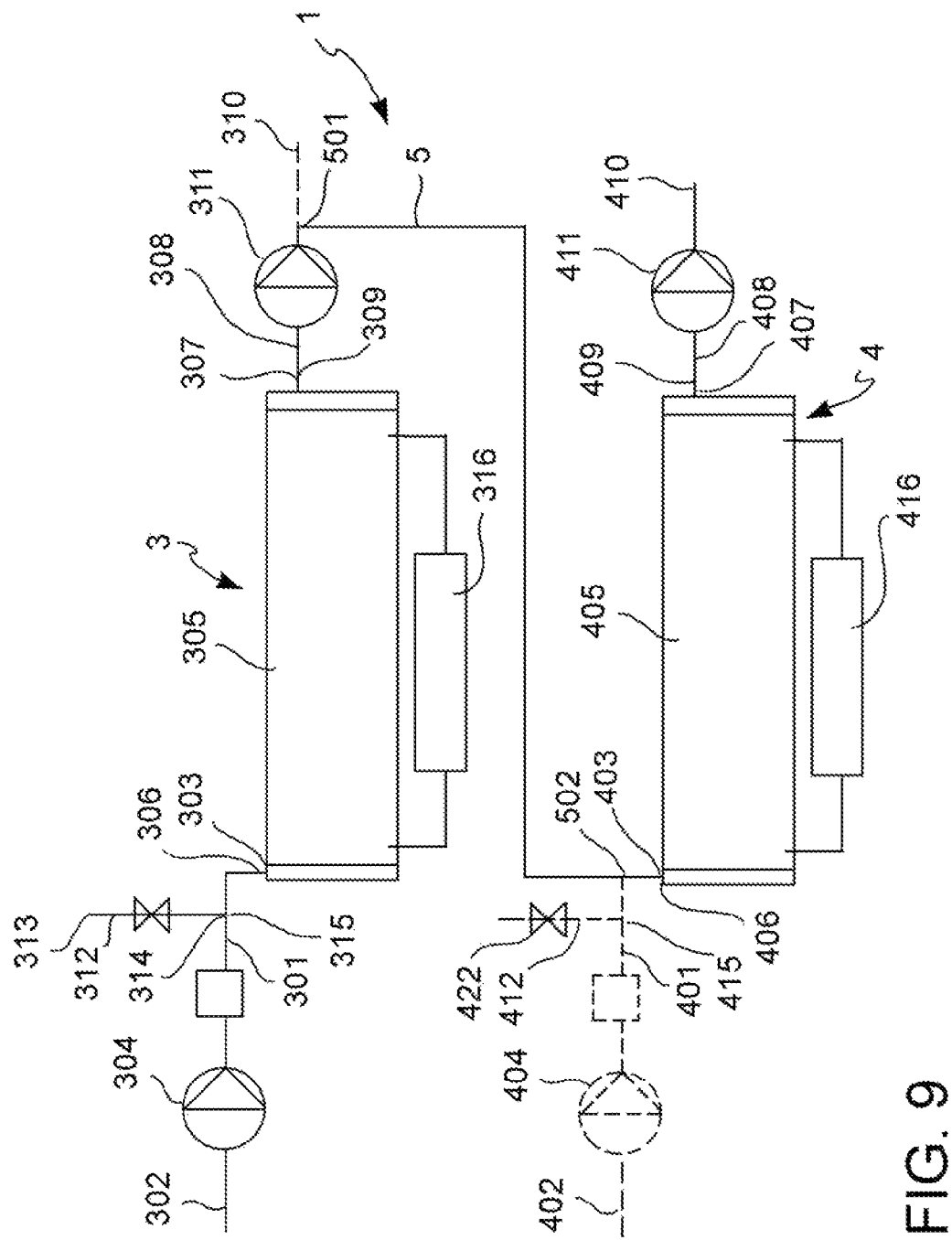
Figure 10:
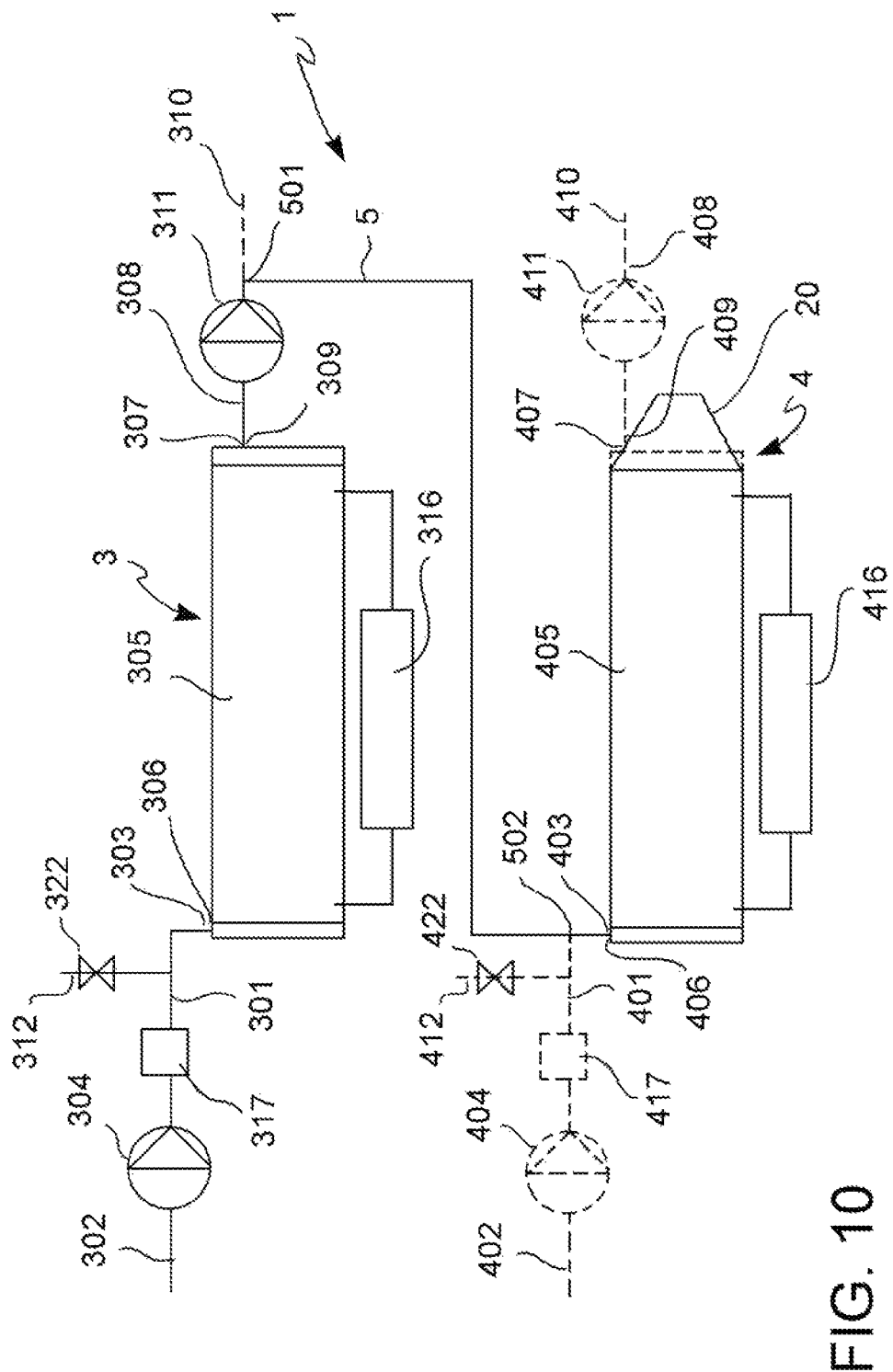

FIG. 8 diagrammatically shows the machine with two mutually disconnected and independent production lines;

FIG. 9 diagrammatically shows the machine with two production lines connected in series by means of an auxiliary conduit;

FIG. 10 is a diagrammatic view of the machine with the two production lines connected in series by means of an auxiliary conduit and an auxiliary outlet cover applied to a second mixing and chilling chamber.

With reference to the figures, an ice-cream making machine is indicated as a whole by reference numeral 1 and comprises:

a support and housing structure 2 which accommodates a first production line 3 and a second production line 4, wherein the first production line 3 comprises:

a first inlet conduit 301 with a first end 302 connectable to a source containing a starting confectionery mass (not shown), and a second end 303, a first inlet pump 304 connected to the first inlet conduit 301, a first mixing and chilling chamber 305 with an inlet opening 306 for the confectionery mass, connected to the second end 303 of the first inlet conduit 301, and an outlet opening 307 for the ice cream output, a first outlet conduit 308 with a first end 309 connected to the outlet opening 307 of the first mixing and chilling chamber 305, and a second end 310, a first outlet pump 311 connected in the first outlet conduit 308, a first air conduit 312 having a first end 313 connectable to an air source (not shown), e.g. an air pump either aboard the machine or external, and a second end 314 connected to the first inlet conduit 301 at a first air supply point 315 between the first inlet pump 304 and the first mixing and chilling chamber 305, a first cooling circuit 316 with compression/expansion cycle in heat exchange connection with the first mixing and chilling chamber 305, wherein the second production line 4 comprises:

a second inlet conduit 401 with a first end 402 connectable to a source containing a starting confectionery mass (not shown) and a second end 403, a second inlet pump 404 connected in the second inlet conduit 401, a second mixing and chilling chamber 405 with an inlet opening 406 for the confectionery mass, connected to the second end 402 of the second inlet conduit 401, and an outlet opening 407, a second outlet conduit 408 with a first end 409 connected to the outlet opening 407 of the second mixing and chilling chamber 405 and a second end 410.

a second outlet pump 411 connected in the second outlet conduit 408, a second air conduit 412 having a first end 413 connectable to an air source (not shown), e.g. an air pump, either aboard the machine or external, and a second end 414 connected to the second inlet conduit 401 in a second air supply point 415 between the second inlet pump 404 and the second mixing and chilling chamber 405, a second cooling circuit 416 with compression/expansion cycle in heat exchange connection with the second mixing and chilling chamber 405, wherein the machine 1 further comprises an auxiliary conduit 5 configured to connect selectively the first outlet conduit 308 in communication either to the second inlet conduit 401 or to the inlet opening 406 of the second mixing and chilling chamber 405, and to disconnect them from each other, in such a way that:

with the auxiliary conduit 5 in disconnected configuration (FIG. 8), the first and the second production lines 3, 4 process confectionery mass/ice-cream flows independently from each other, and with the auxiliary conduit 5 in connected configuration (FIGS. 9, 10), the first and the second production lines 3, 4 are arranged in series and together process a single confectionery mass/ice-cream flow.

With the auxiliary conduit 5 disconnected and with the first and second production lines 3, 4 activated, machine 1 can produce, for example, two independent flows of the same or different ice-cream at a speed of, for example, 700-1000 kg per minute each, at a temperature of, for example, −5° C. to −6° C. If desired, the two ice-cream flows may be successively combined.

With the auxiliary conduit 5 disconnected and with only one of the two production lines 3, 4 activated, the machine can produce, for example, a single flow of ice-cream at a speed of, for example, 700-1000 liters an hour, and at an output temperature of, for example, −5° C. to −6° C.

With the auxiliary conduit 5 connected and with both production lines 3, 4 activated, machine 1 can produce a single flow of ice-cream at double speed, for example at 1400-2000 liters an hour, at an output temperature of, for example, −5° C. to −6° C. The doubled production speed is made possible by the action of the two mixing and chilling chambers 305, 405 and by the action of the two chilling circuits 316, 416 in series on a single confectionery mass flow. In this case, no second separate flow of confectionery mass is fed into the second inlet conduit 401 and the first inlet pump 304 can convey at double speed, whilst the second inlet pump 404 can remain inactive.

Producing ice-cream by means of a single production line at double speed is preferable with respect to producing in parallel by means of two slower production lines, because the same homogeneousness and the same appearance of ice-cream processed together on a single line is never obtained by joining the two flows of ice-cream.

With the auxiliary conduit 5 connected and with both production lines 3, 4 activated, machine 1 can produce, for example, a single flow of ice-cream at a normal speed, for example 700-1000 liters/hour and at a lower temperature, for example −9° C. to −10° C. This is made possible by the action of the two chilling circuits 316, 416 in series on a single confectionery mass flow. Also in this case, a second separate flow of confectionery mass is not feed into the second inlet conduit 401 and the first inlet pump 304 can convey at normal speed, while the second inlet pump 404 can remain inactive.

According to an embodiment, the auxiliary conduit 5 can be permanently (but preferably in all cases removably) connected either to the first outlet conduit 308 and to the second inlet conduit 401 or to the inlet opening 406 of the second mixing and chilling chamber 405. In this case, selection valves 501, 502 may be provided for the insertion in fluid communication and the disconnection of the auxiliary conduit 5 between the first outlet conduit 308 and the second inlet conduit 401 or the inlet opening 406 of the second mixing and chilling chamber 405.

A first selection valve 501 is placed between the first outlet conduit 308 and the auxiliary conduit 5 and can be actuated for:
  opening the communication between the first outlet conduit 308 and the auxiliary conduit 5 and, possibly, closing the first outlet conduit 308 towards or at its second end 310 to avoid undesired leakages.
  interrupting the communication between the first outlet conduit 308 and the auxiliary conduit 5 and, possibly, opening the first outlet conduit 308 towards or at the second end 310 to allow the ice-cream mass produced in the first production line 3 to be let out.

A second selection valve 502 is placed between either the auxiliary conduit 5 and the second inlet conduit 401 or the inlet opening 406 of the second mixing and chilling chamber 405 and can be activated for:
  opening the communication between the auxiliary conduit 5 and the second inlet conduit 401 (or the inlet opening 406) and, possibly, closing the second inlet conduit 401 towards or at its first end 402 to prevent undesired leakages or intakes,
  interrupting the communication between the auxiliary conduit 5 and the second inlet conduit 401 (or the inlet opening 406) and, possibly, opening the second inlet conduit 401 towards or at its first end 402 to allow the entrance of the starting confectionery mass for the second production line 4.

According to a further embodiment, the auxiliary conduit 5 is removably connectable, e.g. without using tools, e.g. by means of coupling jaws, both to the first outlet conduit 308 and to the second inlet conduit 401 (or with the inlet opening 406). For example, the auxiliary conduit 5 is removably mechanically attachable (and in this way fluidically connectable) to an outlet opening of the first outlet pump 311 and to the inlet opening 406 of the second mixing and chilling chamber 405. With the same "insertion" operation of the auxiliary conduit 5, an end portion of the first outlet conduit 308 is disconnected and fluidically separated from the outlet opening of the first outlet pump 311 and the second inlet conduit 401 is disconnected and fluidically separated from the inlet opening 406 of the second mixing and chilling chamber 405.

At first sight, this obviously manual operation not controlled by valves may appear artisanal and not very sophisticated, but on the contrary it is the result of very high optimization and minimization of the configuration time of the machine. Indeed, this embodiment takes into account the fact that, in all cases at each product change, all the pipes of the machine must be washed and the inside of the components with moving mechanical parts (mixing chambers, pumps) is usually subjected to visual inspection to identify any damage and avoid the presence of foreign bodies in the food product. The solution with mechanical connection/disconnection of the entire auxiliary conduit 5 (provided as permanent accessory of machine 1) avoids the need to wash and inspect additional selection valves 501, 502. Preferably, the auxiliary conduit is a rigid tube having a shape suited to fit into a free space of the housing 2, without requiring the movement of other components of machine 1 not directly involved in the connection/disconnection operations.

Advantageously, the auxiliary conduit 5 is connected to the first outlet conduit 308 in a point downstream of the first outlet pump 311, so as to be able to exploit the first outlet pump 311—already dimensioned and configured to convey a mass of chilled ice-cream and thus of creamy or semi-rigid consistency—for conveying the semi-processed ice-cream mass from the first production line 3 to the second production line 4.

More advantageously, the auxiliary conduit 5 is connected either to the second inlet conduit 401 downstream of the second inlet pump 404, and possibly downstream of the second air addition point 415, or directly to the inlet opening 406 or a further inlet opening of the first mixing and chilling chamber 405.

This allows to convey the semi-processed ice-cream mass with less flow resistance and, preferably, using an auxiliary conduit 5 with a flow section area greater than the flow section area of the second inlet conduit 401.

Machine 1 comprises an electric or electronic control system 6 in signal connection with a first flow sensor 317 arranged at/in the first inlet conduit 301, preferably downstream of the first inlet pump 304—to control the real flow rate of the pumped confectionery mass—and possibly upstream of the first air supply point 315—in order to be able to control the supply of the air to the starting confectionery mass as a function of the flow rate measured by means of the first flow sensor 317.

Similarly, the control system 6 is in signal connection with a second flow sensor 417 arranged at/in the second inlet conduit 401, preferably downstream of the second inlet pump 404—to control the real pumped confectionery mass flow rate—and possibly upstream of the second air supply point 415—in order to be able to control the supply of the air to the starting confectionery mass as a function of the flow rate measured by means of the second flow sensor 417.

The control system 6 selectively and independently controls the first and second inlet pumps 304, 404, the first and second outlet pumps 311, 411, first and second stirring or mixing systems 318, 418 of the first and second mixing chambers 305, 405 and the first and second compression/expansion cooling circuits 316, 416, Furthermore, the control system 6 may be in signal connection with and adapted to control air flow adjustment means in the first and second air conduits 312, 412, for example first and second air adjustment valves 322, 422 or first and second air pumps (not shown).

In particular, the control system 6 is configured for:
selectively and individually activating, deactivating and adjusting the flow rate of the first and second inlet pumps 304, 404, and/or
selectively and individually activating, deactivating and adjusting the flow rate of the first and second outlet pumps 311, 411, and/or
selectively and individually activating, deactivating and adjusting the movement speed of the first and second stirring or mixing systems 318, 418 of the first and second mixing chambers 305, 405, and/or
selectively and individually activating and deactivating the first and second cooling circuits 316, 416, and/or
selectively and individually adjusting the intensity of the heat exchange between the first and second cooling circuits 316, 416 and the first and second mixing chambers 305, 405, and/or
selectively and individually interrupting and allowing the air flow in each of the first and second air conduits 312, 412, and/or
selectively and individually interrupting and allowing the air flow in each of the first and second air conduits 312, 412.

For setting the adjustment parameters, the control system 6 comprises a user interface 23, for example a display with keyboard aboard the machine, or a wired or wireless connection or by means of USB connector, for a connection with a remote computer (not shown).

The first and second inlet pumps 304, 404 preferably comprise volumetric (lobe) pumps comprising a shaped chamber, in which two lobe rotors turn synchronously on preferably parallel axes.

The air flow adjustment means in the air conduits 312, 412 preferably comprise a pneumatic interception (ON/OFF) and/or adjustment valve 322, 422, at least one filter, preferably a three-stage purification filter with fine filtering, activated carbon and sterilizable Teflon purifier. A compressor dehumidifier may be arranged upstream of the air conduit 312, 412 (e.g. upstream of the valve 322, 422 and/or of the possible filters). Flow gages, advantageously the so-called mass flow gages, which work according to the anemometer (hot wire) principle and measure the mass flow or standard volumetric flow rate regardless of pressure and temperature, may be used in order to determine the flow rate or air flow speed in the air conduits 312, 412. The air flow gages interact with the interception valves 322, 422 so as to adjust the air flow rate according to the value set in the control system 6.

The flow sensors 317, 417 in the inlet conduits 301, 401 preferably comprise a magnetic flow rate gage.

The mixing and chilling chambers 305, 405 preferably comprise an outer cylinder 7 made of steel, possible wrapped in an outer layer 8 made of heat-insulating material, and an inner cylinder 9 made of steel positioned inside the outer cylinder 7. The inner cylinder 9 internally delimits a passage channel for the confectionery mass.

An annular gap 10 is formed between the outer cylinder 7 and the inner cylinder 9 for the passage of the refrigerating fluid of the chilling circuit 316, 416, preferably in counter-flow with respect to the conveying direction of the confectionery mass. The wall of the inner cylinder 9 forms the heat exchange surface for refrigerating the confectionery mass.

A stirrer 11 or stirrer-scraper (the so-called 'dasher') is arranged inside the inner cylinder 9, which stirrer 11 or stirrer-scraper can be actuated in rotation about the longitudinal axis 12 of the chamber 305, 405, e.g. by means of an electric motor 13 arranged outside the outer cylinder 7 and connected to the stirrer 11 by means of a transmission shaft. The stirrer 11 may comprise a hollow cylinder 24 with a plurality of passage holes and/or an eccentric bar 25 possibly positioned inside the perforated cylinder 24, as well as one or more scraping blades 26 protruding from the perforated cylinder 24 towards the inner surface of the inner cylinder 9 and which scrape the ice-cream which is formed on the inner surface of the inner cylinder 9, thus creating the produced ice-cream mass.

The inner cylinder 9 is closed, on the inlet side of the confectionery mass, by means of an inlet cover 16 and on the confectionery mass outlet side by means of an outlet cover 17. The inlet covers 16 form the respective inlet openings 306, 406 for the confectionery mass and the outlet covers 17 form the outlet openings 307, 407 for the ice-cream. Both the inlet and outlet covers 16 and 17 form seats for rotationally supporting the stirrer 11 about the longitudinal axis 12.

Figure 7:
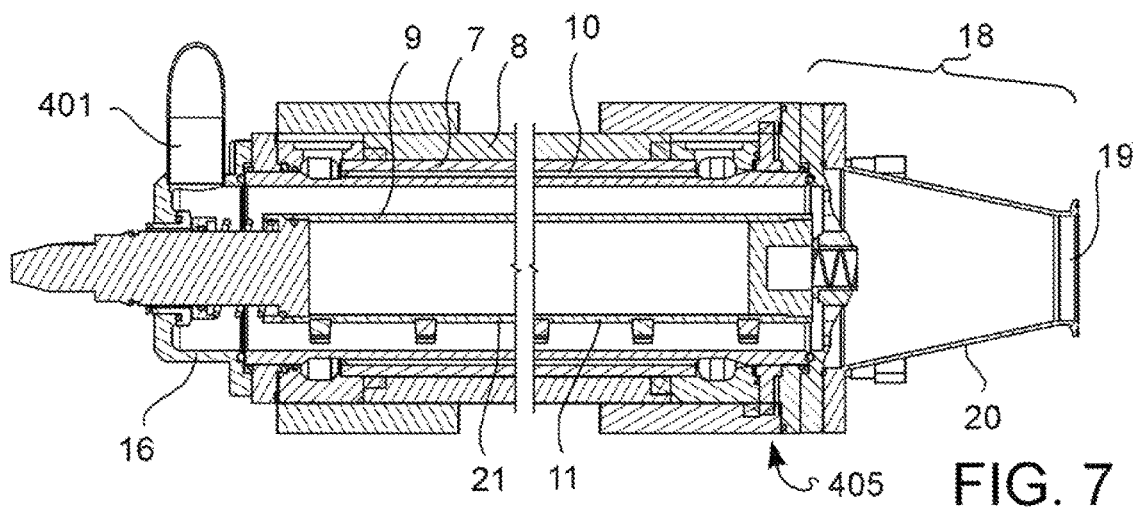
FIG. 7 is a section view of a mixing and chilling chamber configured with an auxiliary dasher without eccentric bar and with an auxiliary outlet cover for an ice-cream mass chilled to a very low temperature.

According to an embodiment (FIG. 7), the machine 1 may comprise an auxiliary outlet cover 18 which can be removably coupled to the second mixing and chilling chamber 405, instead of the second outlet cover 17 (also removable), and which forms an auxiliary outlet opening 19 of larger section than the second outlet opening 407 and, preferably, a converging outlet mouth, e.g. frusto-conical, and concentric with a longitudinal axis 12 in order to facilitate the output of stiffer ice-cream in the case of refrigeration at a very low temperature, for example from −9° C. to −10° C.

Machine 1 may also comprise an auxiliary stirrer 21 (FIG. 7) which can be removably inserted in the second mixing and chilling chamber 405, instead of the second stirrer 11 (also removable), which does not have any eccentric bar 25 in order to facilitate the passage of the already pre-processed and pre-cooled ice-cream from the first production line 3 and thus which does not necessarily require additional emulsification, but only a moderate mixing aimed at an efficient heat exchange (chilling).

The first and second chilling circuits 316, 416 preferably comprise so-called compression and expansion circuits, each comprising a compressor 319, 419 which compresses a refrigerant gas, the temperature of which increases as result of the reduction of its volume, a heat exchanger or external condenser 320, 420 arranged downstream of the compressor 319, 419 and within which the compressed refrigerant gas looses heat and possibly condensates from gaseous phase to liquid phase, an evaporator 321, 421 arranged downstream of the condenser 320, 420, and in which the refrigerant chilling gas is made to expand and evaporate, and thus cool with the minimum possible entropy, for example by means of a lamination valve, and finally a heat exchanger inside the mixing and cooling chamber 305, 405, formed for example by the annular gap 10 in which the refrigerant gas transfers cold to the confectionery mass and from it returns to the compressor 319, 419 to start a new cycle.

Figure 2:
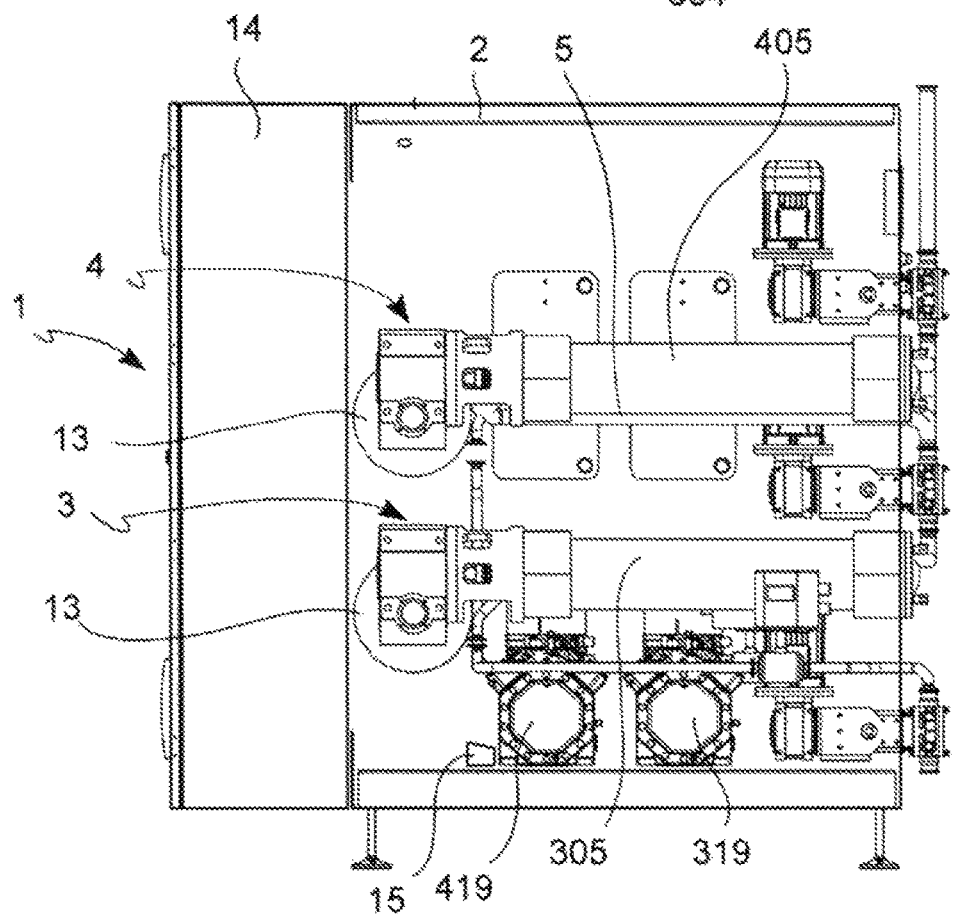
FIG. 2 is a front view of the machine in FIG. 1.
Figure 3:
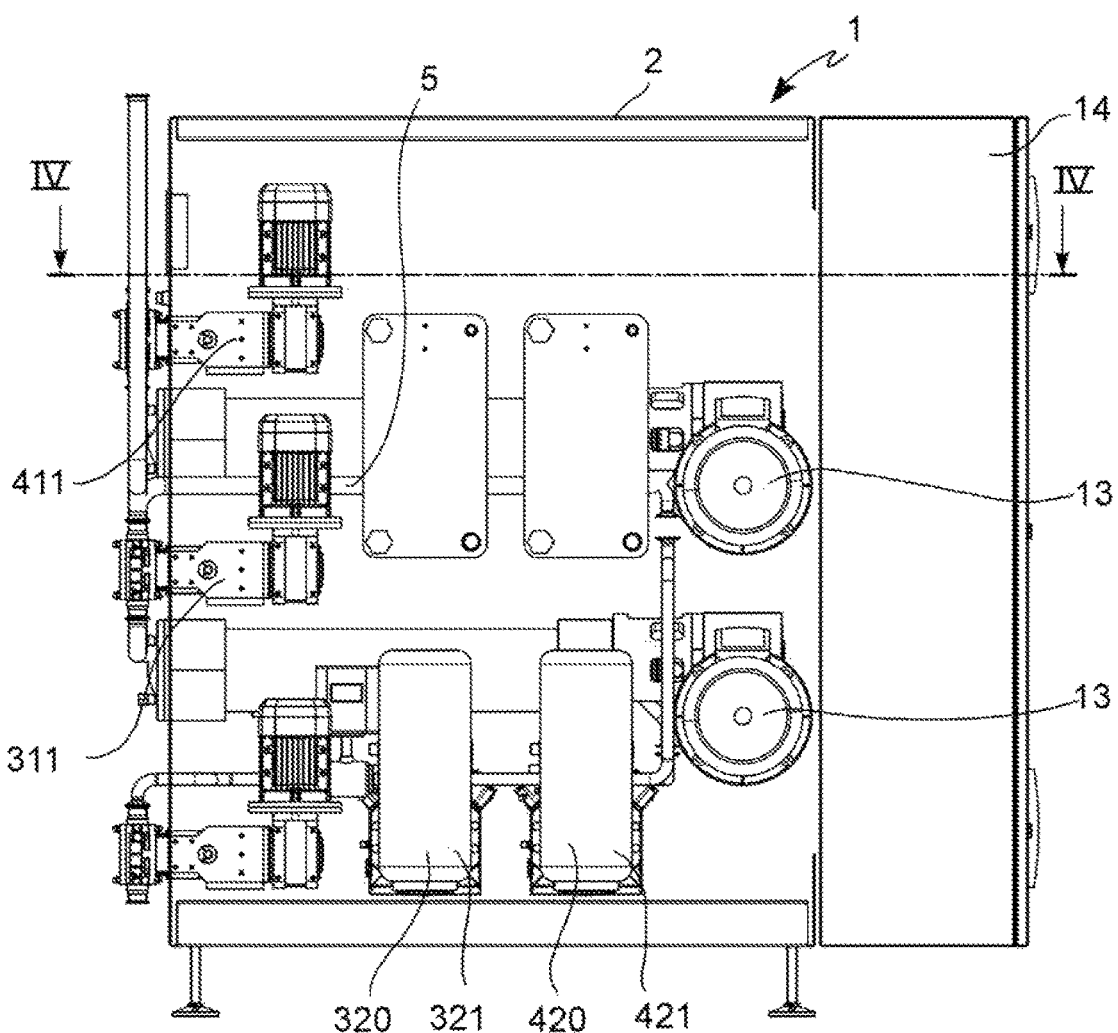
FIG. 3 is a rear view of the machine in FIG. 1.
Figure 4:
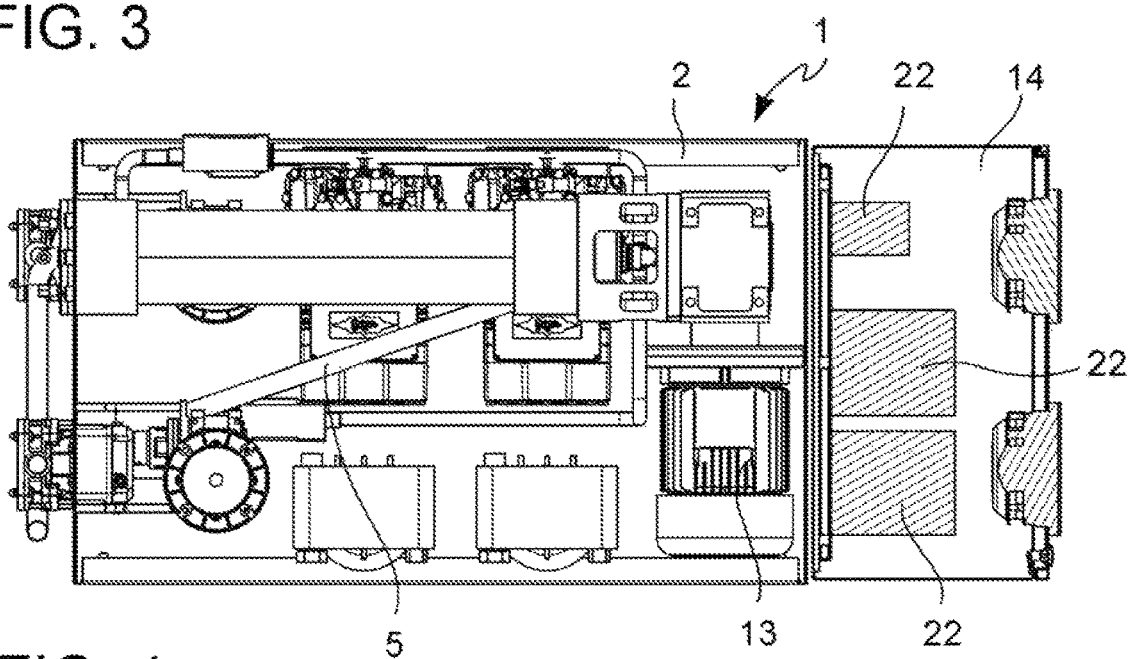
FIG. 4 is a section view taken along section plane IV-IV in FIG. 3.
Figure 5:
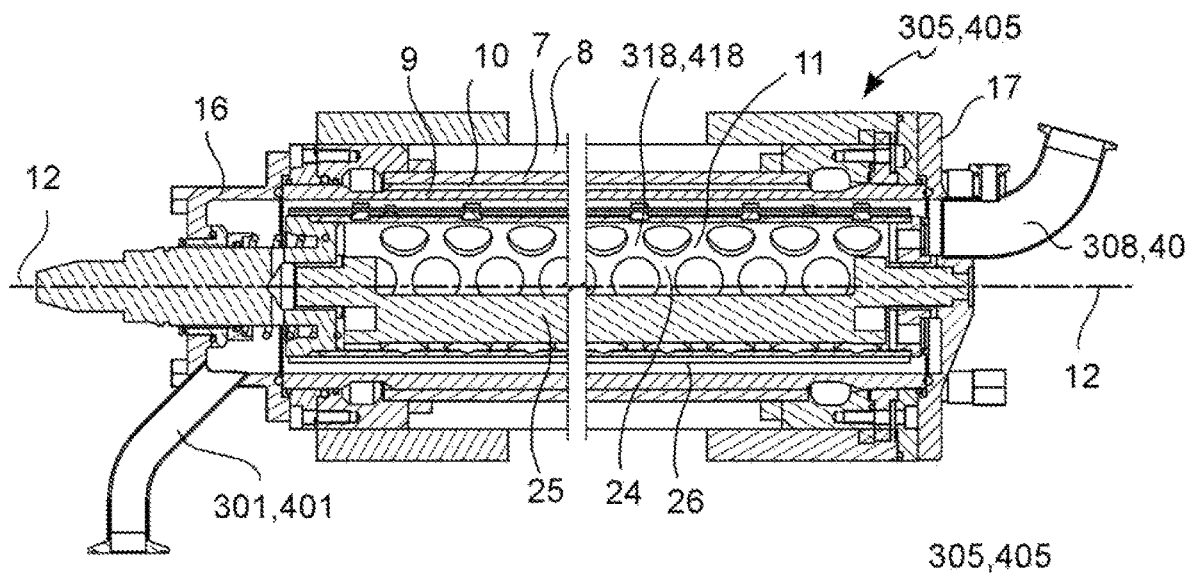
FIGS. 5 and 6 are section views of a mixing and chilling chamber according to an embodiment.
Figure 6:
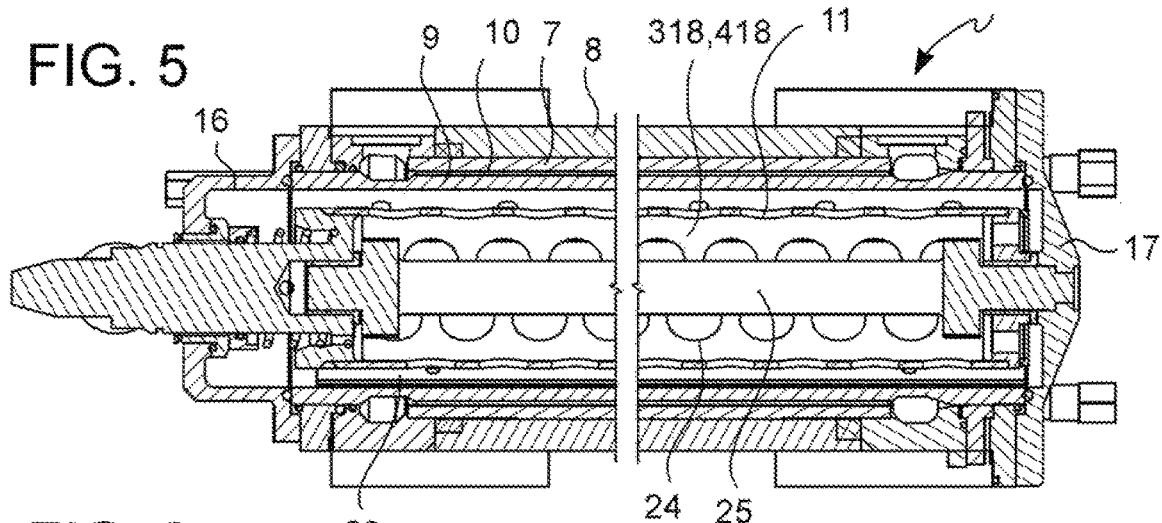

Preferably, at least the two compressors 319, 419 and the two condensers 320, 420 of the two chilling circuits 316, 416 are positioned side-by-side in a lower region of the support structure 2, and all extend at least partially under both the mixing and chilling chambers 305, 405 (FIGS. 2, 3).

This allows to save space, lowers the center of gravity of the entire machine 1 and positions the respective pressure sealing connections, in a grouped and approximated manner.

The first and second mixing and chilling chambers 305, 405 are positioned one above the other and preferably their longitudinal axes 12 lay on a same vertical plane.

Similarly, the first and second outlet pumps 311, 411 are positioned one over the other and preferably and mutually vertically aligned.

Figure 1:
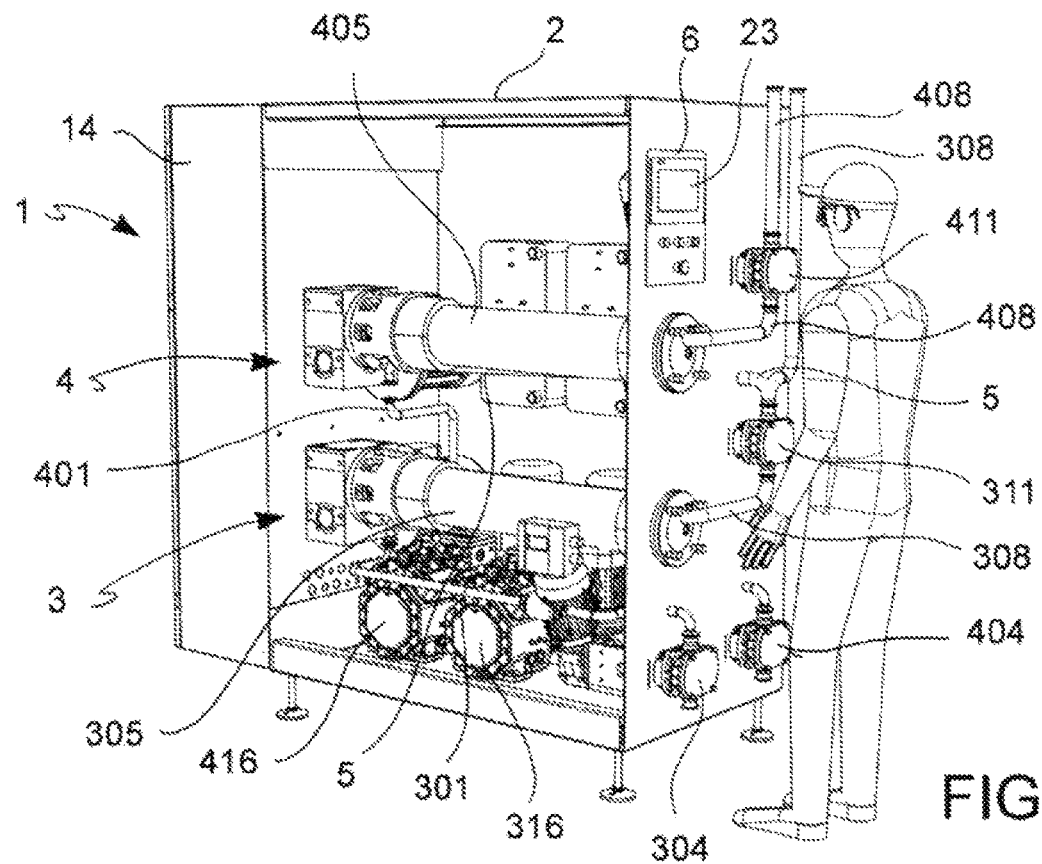
FIG. 1 is a perspective view of an ice-cream making machine according to an embodiment of the invention.

Furthermore, the first and second outlet pumps 311, 411 are both positioned above the two compressors 319, 419 and above the two condensers 320, 420 of the two cooling circuits 316, 416, distanced horizontally from the first and second mixing and chilling chambers 305, 405 and vertically alternating or staggered with them (FIGS. 1, 2, 3).

The first and second inlet pumps 304, 404 are instead both positioned in the lower region of machine 1 and both extend at least partially below both the mixing and chilling chambers 305, 405 (FIGS. 1, 2), preferably on a same horizontal plane with the two compressors 319, 419 and/or with the two condensers 320, 420 of the two cooling circuits 316, 416. Preferably, the first and second inlet pumps 304, 404 are arranged on a same horizontal plane. Finally, the electrical control and supply components 22 (electrical power components) of the machine 1 are preferably housed in a separate compartment 14 formed in the support and housing structure 2.

The positioning of the single components and functional groups of the machine 1 allows to keep its dimensions small and to substantially not exceed the dimensions of a comparable ice-cream making machine of the prior art with a single production line.

In order to further reduce the dimensions of machine 1 it is suggested to configure the first and second cooling circuits 316, 416 as compression and expansion cooling circuits, using $CO_2$ as refrigerant gas and to cool the external heat exchanger 320, 420 with cold water, at very low temperature in the range from $-5°$ C. to $+2°$ C., using either water with addition of antifreeze, for example glycol, or only using chilled water, fed to machine 1 by means of a cold water connection 15 envisaged on board of the machine 1. In this manner, it is possible to exploit the higher specific weight and consequently the higher heat capacity of $CO_2$, for example with respect to Freon gas, and thus to further reduce the size of the cooling circuits and of the entire machine 1. The space for cooling the cold water needed for the operation of the $CO_2$ cooling circuits may be easily found in less crowded areas of the production plant and the cold water may be easily transported to the machine 1 by means of simple flexible pipes.

Furthermore, the control system 6 is configured to allow a selective adjustment of the chilling power of the cooling circuits 316, 416 by adjusting the rotation speed of the (motors of the) compressors 319, 419 by means of inverters.

Obviously, a person skilled in the art may make further changes and variants to the ice-cream making machine 1 according to the present invention all without departing from the scope of protection of the invention, as defined in the following claims.

The invention claimed is:

1. Machine (1) for making ice-cream, comprising:
a support and housing structure (2) which accommodates a first production line (3) and a second production line (4), wherein the first production line (3) comprises:
a first inlet conduit (301) with a first end (302) connectable to a source containing a starting confectionery mass, and a second end (303),
a first inlet pump (304) connected in the first inlet conduit (301),
a first mixing and chilling chamber (305) with an inlet opening (306) for the confectionery mass, connected to the second end (303) of the first inlet conduit (301), and an outlet opening (307) for the ice cream output,
a first outlet conduit (308) with a first end (309) connected to the outlet opening (307) of the first mixing and chilling chamber (305), and a second end (310),
a first outlet pump (311) connected in the first outlet conduit (308),
a first cooling circuit (316) in heat exchange connection with the first mixing and chilling chamber (305),
wherein the second production line (4) comprises:
a second inlet conduit (401) with a first end (402) connectable to a source containing a starting confectionery mass, and a second end (403),
a second inlet pump (404) connected in the second inlet conduit (401),
a second mixing and chilling chamber (405) with an inlet opening (406) for the confectionery mass, connected to the second end (402) of the second inlet conduit (401), and an outlet opening (407),
a second outlet conduit (408) with a first end (409) connected to the outlet opening (407) of the second mixing and chilling chamber (405), and a second end (410),
a second outlet pump (411) connected in the second outlet conduit (408),
a second cooling circuit (416) in heat exchange connection with the second mixing and chilling chamber (405),
wherein the machine (1) further comprises an auxiliary conduit (5) configured to allow to selectively connect the first outlet conduit (308) in communication with the second inlet conduit (401) or with the inlet opening (406) of the second mixing and chilling chamber (405) and disconnect them from each other, in such a way that:
with the auxiliary conduit (5) in the disconnected configuration, the first and the second production line (3, 4) process confectionery mass flows independently of one another, and
with the auxiliary conduit (5) in the connected configuration, the first and the second production line (3, 4) are placed in series and together process a single confectionery mass flow.

2. Machine (1) according to claim 1, comprising:
a first air conduit (312) having a first end (313) connectable to an air source, and a second end (314) connected to the first inlet conduit (301) at a first air supply point (315) between the first input pump (304) and the first mixing and chilling chamber (305),
a second air conduit (412) having a first end (413) connectable to an air source, and a second end (414) connected to the second inlet conduit (401) at a second air supply point (415) between the second input pump (404) and the second mixing and chilling chamber (405).

3. Machine (1) according to claim 1 or 2, wherein the auxiliary conduit (5) is removably connectable, in particular via coupling jaws, both with the first outlet conduit (308) and with the second inlet conduit (401) or with the inlet opening (406) of the second mixing and chilling chamber (405).

4. Machine (1) according to claim 3, wherein the auxiliary conduit (5) is removably mechanically attachable, and in this way fluidically connectable, to an outlet opening of the first outlet pump (311) and to the inlet opening (406) of the second mixing and chilling chamber (405), wherein:
- an end portion of the first outlet conduit (308) is mechanically detachable, and in this way fluidically separable, from the outlet opening of the first outlet pump (311),
- the second inlet conduit (401) is mechanically detachable, and in this way fluidically separable, from the inlet opening (406) of the second mixing and chilling chamber (405).

5. Machine (1) according to claim 4, wherein the auxiliary conduit is a rigid tube having a shape suitable for fitting into a free space of the housing (2), without requiring the movement of other components of the machine (1) not directly involved in the connection/disconnection operations of the first and second production lines (3, 4) to/from each other.

6. Machine (1) according to claim 1 or 2, comprising selection valves (501, 502) for the connection in fluid communication and the disconnection of the auxiliary conduit (5) between the first outlet conduit (308) and the second inlet conduit (401) or the inlet opening (406) of the second mixing and chilling chamber (405).

7. Machine (1) according to claim 1, wherein the auxiliary conduit (5) is connected to the first outlet conduit (308) at a point downstream of the first outlet pump (311).

8. Machine (1) according to claim 1, comprising a first flow sensor (317) arranged at the first inlet conduit (301) and a second flow sensor (417) arranged at the second inlet conduit (401).

9. Machine (1) according to claim 1, comprising a control system (6) which selectively and independently controls the first (304) and second (404) inlet pumps, the first (311) and second (411) outlet pumps, first (318) and second (418) stirring or mixing systems of the first (305) and second (405) mixing chambers and first (316) and second (416) compression/expansion cooling circuits.

10. Machine (1) according to claim 9, wherein the control system (6) adjusts an air flow in the first (312) and second (412) air conduits.

11. Machine (1) according to claim 1, comprising an auxiliary outlet cover (18) that can be removably coupled to the second mixing and chilling chamber (405), for replacing a second removable outlet cover (17) forming the outlet opening (407) of the second mixing and chilling chamber (405),
wherein said auxiliary outlet cover (18) forms an auxiliary outlet opening (19) having larger cross-section than said outlet opening (407) of the second outlet cover (17).

12. Machine (1) according to claim 11, wherein said auxiliary outlet cover (18) forms a convergent outlet mouth, in particular frusto-conical, and concentric with a longitudinal axis (12) of the second mixing and chilling chamber (405), in order to facilitate the output of stiffer ice-cream in the case of refrigeration at a very low temperature.

13. Machine (1) according to claim 1, wherein the first (316) and second (416) cooling circuits are compression and expansion cooling circuits, with $CO_2$ as the cooling gas, and with an external heat exchanger (320, 420) cooled by cold water fed to the machine (1) by means of a connection (15) on the machine (1).

14. Machine (1) for making ice-cream, comprising:
a support and housing structure (2) which accommodates a first production line (3) and a second production line (4), wherein:
the first production line (3) comprises a first inlet pump (304), a first mixing and chilling chamber (305), a first outlet pump (311) connected in series, as well as a first cooling circuit (316) in heat exchange connection with the first mixing and chilling chamber (305),
the second production line (4) comprises a second inlet pump (404), a second mixing and chilling chamber (405), a second outlet pump (411) connected in series, as well as a second cooling circuit (416) in heat exchange connection with the second mixing and chilling chamber (405),
wherein the machine (1) further comprises an auxiliary conduit (5) configured to selectively connect and disconnect the first outlet pump (311) to/from an inlet of the second mixing and chilling chamber (405), in such a way that:
with the auxiliary conduit (5) in the disconnected configuration, the first and the second production line (3, 4) process confectionery mass flows independently of one another, and
with the auxiliary conduit (5) in the connected configuration, the first and the second production line (3, 4) are placed in series and together process a single confectionery mass flow.

\* \* \* \* \*